(12) United States Patent
Dettorre

(10) Patent No.: US 9,610,745 B2
(45) Date of Patent: Apr. 4, 2017

(54) DEVICE AND METHOD FOR INSERTING A WIRE INTO A TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Jean-Marie Dettorre, Aubiere (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 14/577,595

(22) Filed: Dec. 19, 2014

(65) Prior Publication Data

US 2015/0101737 A1    Apr. 16, 2015

Related U.S. Application Data

(62) Division of application No. 13/580,123, filed as application No. PCT/FR2011/050327 on Feb. 16, 2011, now abandoned.

(30) Foreign Application Priority Data

Feb. 18, 2010   (FR) ..................................... 10 51159

(51) Int. Cl.
  *B29D 30/00*   (2006.01)
  *B29D 30/52*   (2006.01)
  (Continued)

(52) U.S. Cl.
  CPC ......... *B29D 30/0061* (2013.01); *B29D 30/52* (2013.01); *B29D 30/66* (2013.01);
  (Continued)

(58) Field of Classification Search
  CPC   B29D 30/66; B29D 30/0061; B29D 30/0678; B29D 2030/662; B29D 2030/665; B29D 2030/526; B29D 30/52; B29D 30/58; B60C 11/14; B60C 11/18; B60C 11/185; B60C 2011/145; B60C 19/08; B60C 19/082; B60C 11/16; B60C 11/1625;
  (Continued)

(56) References Cited

U.S. PATENT DOCUMENTS 227,192 A  *  5/1880  Wagner et al. ............... 112/222
3,347,192 A  *  10/1967  Lukins .......................... 112/222
(Continued)

FOREIGN PATENT DOCUMENTS

CN   1260843   7/2000
CN   2422311   3/2001
(Continued)

*Primary Examiner* — Adrienne C Johnstone
(74) *Attorney, Agent, or Firm* — Cozen O'Connor

(57) ABSTRACT

The needle (12) of the device for inserting a wire into a tire has: a piercing zone (18) having an axis of symmetry, and a duct (30) having a proximal opening and a distal opening (36) opening into the zone (18) and off-center relative to the axis, the duct consisting of the proximal opening and of a rectilinear profiled section including the distal opening.

10 Claims, 5 Drawing Sheets

(51) Int. Cl.
  *B29D 30/66* (2006.01)
  *D05B 85/10* (2006.01)
  *B60C 11/14* (2006.01)
  *B60C 19/08* (2006.01)

(52) U.S. Cl.
  CPC ........ *D05B 85/10* (2013.01); *B29D 2030/526* (2013.01); *B29D 2030/662* (2013.01); *B29D 2030/665* (2013.01); *B60C 11/14* (2013.01); *B60C 19/082* (2013.04); *B60C 2011/145* (2013.04); *Y10T 29/49538* (2015.01); *Y10T 29/53509* (2015.01)

(58) Field of Classification Search
  CPC ............. B60C 11/1631; B60C 11/1637; Y10T 156/12; Y10T 29/49833; Y10T 29/53509; Y10T 29/49538; D05B 85/10; D05B 85/00; D05C 15/06; D05C 15/20; D05C 11/02; D05C 1/06; B21G 1/08; B21G 1/10; B29C 70/64; B29C 70/82; B29C 70/54; B29C 70/06; B29C 70/887; B29C 70/88; B32B 7/08
  USPC ....... 156/72, 92, 93, 114, 110.1, 394.1, 510, 156/303.1; 152/168, 152.1, 212, 209.4, 152/DIG. 2; 112/80.05, 80.08, 80.16, 112/222; 227/64–76, 80, 79; 29/815, 29/894.37, 432; 606/222; 163/5; 223/102–104; 140/139, 140, 147, 123.6; 83/951; 300/1–3
  See application file for complete search history.

(56) References Cited

U.S. PATENT DOCUMENTS

| | | | |
|---|---|---|---|
| 3,356,047 A | | 12/1967 | Short |
| 3,498,242 A | | 3/1970 | Peterson |
| 3,523,510 A | | 8/1970 | Mueller |
| 3,633,919 A | | 1/1972 | Liccardello |
| 3,753,412 A | * | 8/1973 | Shepard ........................ 112/222 |
| 3,986,468 A | * | 10/1976 | Szostak .................. D05B 85/00 112/222 |
| 4,611,740 A | | 9/1986 | Kunreuther |
| 5,507,758 A | | 4/1996 | Thomason et al. |
| 5,515,798 A | * | 5/1996 | Cahuzac ................... 112/470.12 |
| 5,543,005 A | * | 8/1996 | Monget ........................ 156/93 X |
| 6,077,572 A | | 6/2000 | Hopwood et al. |
| 6,467,149 B2 | * | 10/2002 | Sentmanat ...................... 227/67 |
| 2007/0062631 A1 | | 3/2007 | Mihalik |

FOREIGN PATENT DOCUMENTS

| | | |
|---|---|---|
| CN | 1871118 | 11/2006 |
| DE | 202 1 613 | 2/2003 |
| EP | 0 041 710 | 12/1981 |
| EP | 0 820 932 | 1/1998 |
| JP | 58-160756 U | 10/1983 |

\* cited by examiner

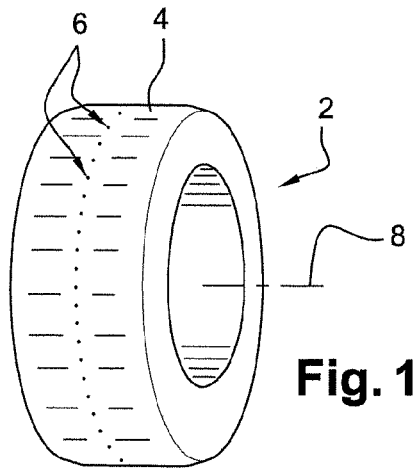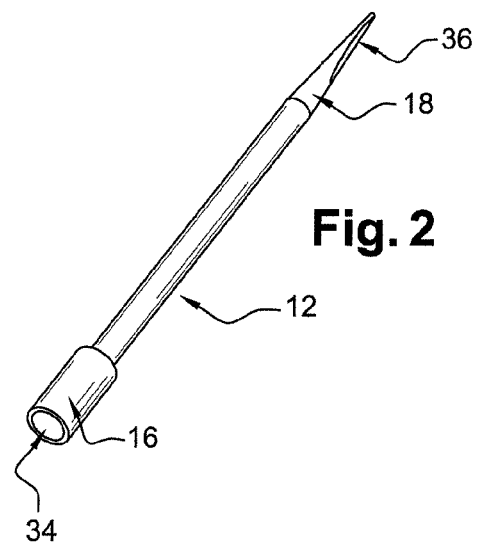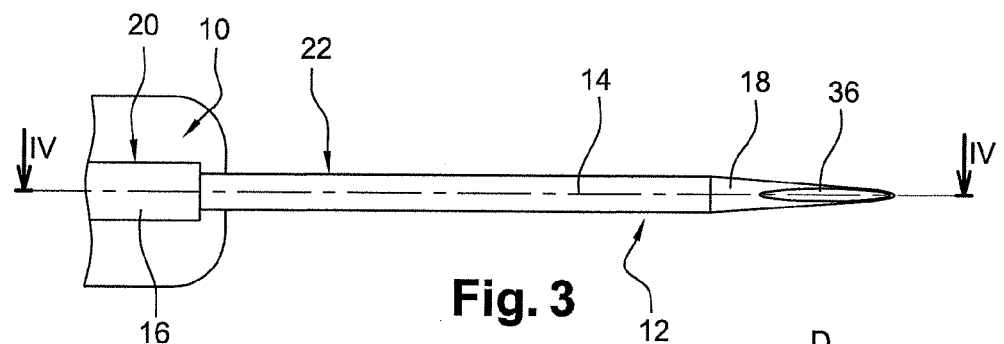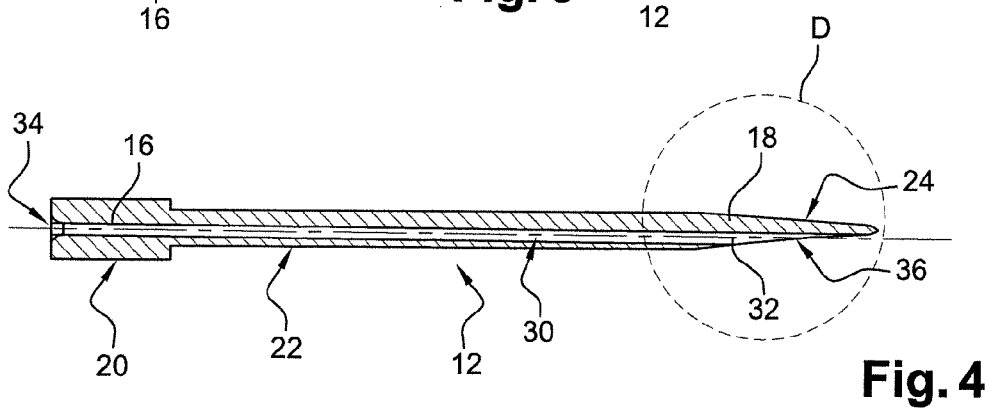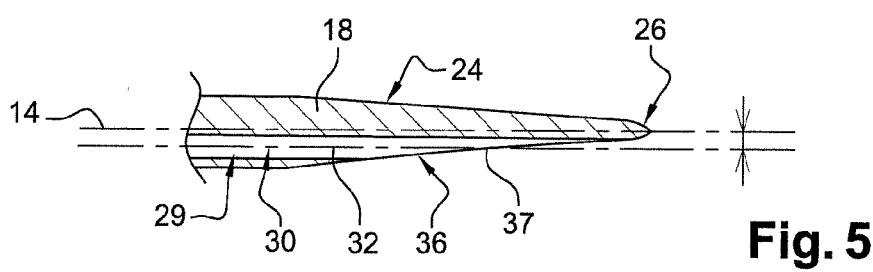

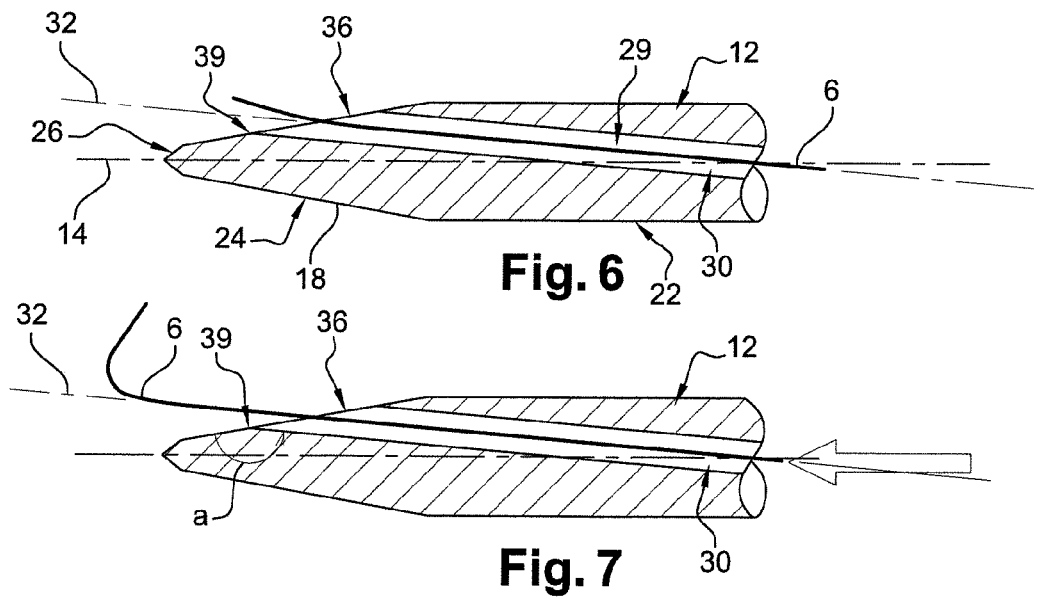
Fig. 6
Fig. 7
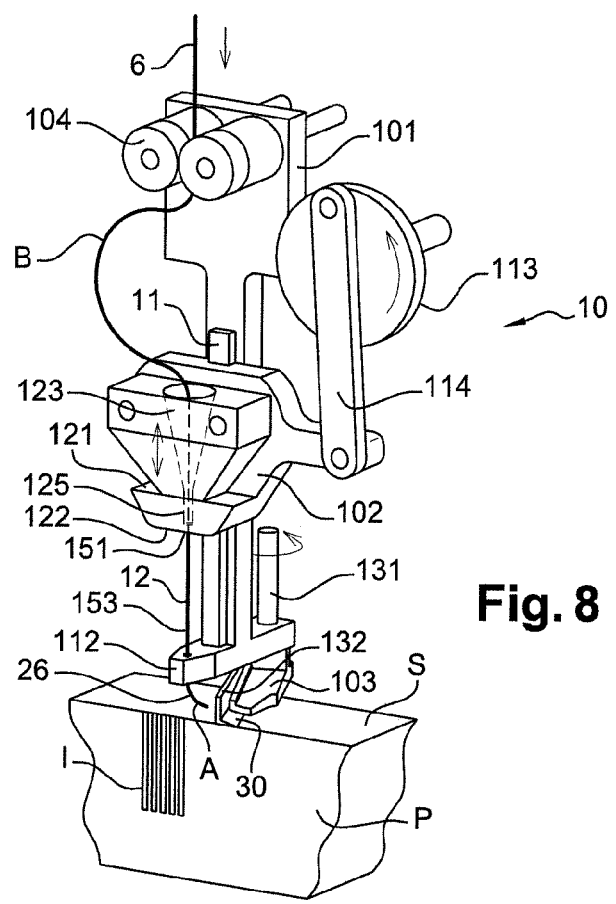
Fig. 8

DEVICE AND METHOD FOR INSERTING A WIRE INTO A TIRE

CROSS REFERENCE TO RELATED APPLICATIONS

This application is a divisional of U.S. application Ser. No. 13/580,123 filed on Mar. 13, 2013 know abandoned) which claims the priority under 35 U.S.C. 371 of International application No. PCT/FR2011/050327 filed on Feb. 16, 2011. Priority is also claimed on French application No. 10/51159 filed on Feb. 18, 2010, the entire content of which is hereby incorporated by reference.

FIELD OF THE INVENTION

The invention relates to the manufacture of vehicle-wheel tires and in particular the insertion of a wire into the tire tread.

BACKGROUND OF THE INVENTION

It is known practice to insert electrically conductive wires into the tread of a tire in a direction radial to an axis of the tire. The wires may have a mechanical function by improving certain contacts of the tire with the outside environment. They also make it possible to make the material into which they are inserted anisotropic. They may also ensure the electrostatic discharge of the tire, notably when the latter is silica-enriched.

It is found that the needles used to pierce the tire and insert the wire therein wear rapidly.

SUMMARY OF THE INVENTION

One object of the invention is to prolong the service life of the needles.

For this purpose one aspect of the invention is directed to a needle for inserting a wire into a tire, which has:
 a piercing zone having an axis of symmetry, and
 a duct having a proximal opening and a distal opening opening into the zone and off-centre relative to the axis, the duct consisting of the proximal opening and of a rectilinear profiled section including the distal opening.

Therefore, the piercing zone is reinforced on one side of the axis by extra material, which makes it more wear-resistant.

Moreover, since the section is rectilinear, it is stripped of obstacles such as an elbow, curvature or chicane. If it had some of these, there would be a considerable risk of jamming when the wire advances in the needle, which would block the wire in the needle and would compromise the whole method. With the rectilinear section that forms the majority of the needle, this risk is reduced to the minimum so that it greatly eases the advance of the wire in the needle. This advantage is all the more important when the wire used, which is often made of metal, has just enough rigidity to allow it to be pushed into the duct. Moreover, it is desired that the wire should advance as quickly as possible in the duct because its speed is one of the parameters limiting the speed of execution of the method. The risk of jamming increases if the speed of the wire is increased. The value of a rectilinear section is therefore particularly high for the high execution speeds.

Moreover, the rectilinear shape of the duct over the majority of its length allows it to have a very slight, or even zero, inclination relative to the axis of symmetry in the piercing zone. As a result, the ridge forming the intersection between the piercing zone and the distal opening has, in axial section, on the side of the axis of symmetry, an angle that can be more easily produced as obtuse and even close to 180°. It is for example between 135 and 180°, even between 160 and 180°. This ridge is therefore very little pronounced and reduces the risks that the needle catches the wire and takes it away when it retracts in order to leave the wire in the rubber. The piercing zone at the distal end of the cylindrical part has a bisecting plane of mirror symmetry, and has a diameter that reduces toward a distal end of the shaft in a conical shape.

Advantageously, the distal opening extends entirely on one and the same side of the axis.

Preferably, the distal opening extends entirely at a distance from the axis.

Thus, the reinforced portion of the zone is in the axis of the needle and has a particularly high wear resistance.

Advantageously, the duct has a duct axis that is inclined relative to the axis of symmetry of the zone.

This is an embodiment of the invention that is simple to manufacture, that does not weaken a portion of the needle and that makes it possible to reconcile the reinforcement of the piercing zone and the rectilinear shape of the duct.

Advantageously, the piercing zone has an axi-symmetric face into which the distal opening opens entirely.

Preferably, the needle has a support zone into which the proximal opening opens while being concentric with the support zone.

Thus, although the duct is off-centre in the piercing zone, it remains centred in the other zone, notably in order to make it easier for the insertion device to hold the needle and to make the needle robust in this location.

Advantageously, the needle is rectilinear.

Preferably, the needle is made of metal or of metal alloy.

Preferably, the piercing zone has a greater hardness than that of another portion of the needle.

Specifically, the extra material obtained by off-centring the duct makes the application of a treatment designed to increase its hardness particularly effective.

Another aspect of the invention is directed to a device for inserting a wire into a tire, that comprises a needle according to an embodiment of the invention.

Another aspect of the invention is directed to a method for manufacturing a needle according to an embodiment of the invention, in which the piercing zone is treated in order to increase the hardness thereof.

Another aspect of the invention is directed to a method in which a wire is inserted into an element comprising rubber by means of a needle according to an embodiment of the invention.

BRIEF DESCRIPTION OF THE DRAWINGS

Other features and advantages of the invention will also appear in the following description of non-limiting examples with reference to the appended drawings in which:

FIG. 1 is a view in perspective of a tire manufactured in accordance with an embodiment of the invention;

FIGS. 2, 3 and 4 are views respectively in perspective, from the side and in axial section along the plane IV-IV of FIG. 3, the plane of median longitudinal symmetry, of a needle according to an embodiment of the invention;

FIG. 5 is a view on a larger scale of the detail D of FIG. 4;

FIGS. 6 and 7 are views similar to FIG. 5 showing the wire in the needle;

FIG. 8 is a view in perspective of a device according to an embodiment of the invention;

DETAILED DESCRIPTION OF THE DRAWINGS

Figure 9:
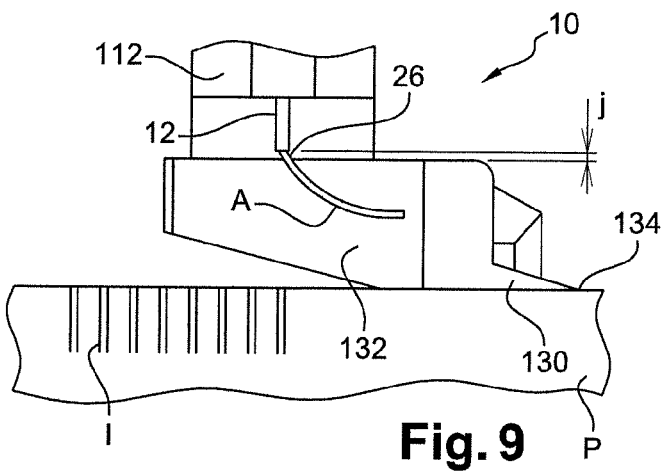
FIGS. 9 to 11 represent details of operation of the knife during the creation of the leader with the device of FIG. 8.

FIG. 1 shows a tire 2 intended notably for wheels for a vehicle of the light, heavy goods or civil engineering type.

This tire has, on the periphery, at its circumference, a tread 4 into which are inserted wires 6 extending over at least a section of the wire in a direction radial to a general axis of symmetry 8 of the tire. The wires 6 extend in this instance in a zone of the tread that is silica-enriched. They are conductive of electricity. Their end is at the outer face of the tread.

With reference to FIGS. 2 to 5, the wires 6 are inserted during the manufacture of the tire by means of a device 10 supporting a needle 12. The latter has an elongate shape, in this instance a rectilinear shape. It has an axis of symmetry 14 which extends along the medium staple of the needle, the needle having a general outer shape that is axi-symmetric about this axis.

The needle 12 has, on the left of the figures, a proximal end zone or support zone 16, and on the right a distal end zone or piercing zone 18.

The proximal end zone 16 has a cylindrical outer face 20 with a circular cross section. From this zone, the needle has a cylindrical outer face 22, with a circular cross section, extending towards the piercing zone 18 and having a smaller diameter than that of the proximal zone 16. The face 22 forms the body of the needle and extends over more than half the length of the latter. From the right end of the face 22, the piercing zone 18 has a first axi-symmetric face 24 that in this instance is frustoconical in shape, the diameter of the cone reducing as it moves away from the support zone. From the right edge of this face, the zone 18 has a second frustoconical face 26 having an angle of aperture greater than the angle of the face 24. This face 26, also axi-symmetric, forms the terminal end of the piercing zone and of the needle.

The four faces 20, 22, 24 and 26 have the axis 14 for the axis of symmetry.

The needle 12 has an internal longitudinal duct 30. The duct has an axis of symmetry 32 distinct from the axis 14 and inclined relative to the latter. The duct is in this instance rectilinear and has a circular section in a plane perpendicular to its axis 32. The duct 30 has a proximal opening 34 opening into the support zone 16 and a distal opening 36 opening into the piercing zone 18.

The duct has a section 29 extending from the proximal opening 34 and being contiguous with the latter. This single continuous section comprises the distal opening 36 and is rectilinear, profiled and cylindrical. The duct therefore in this instance consists of the proximal opening, of tapered shape, and of the profiled section.

The axis 32 intersects the axis 14 at the proximal opening 34 so that the latter is centred on each of these two axes.

The inclination of the axis 32 relative to the axis 14 and the diameter of the duct 30 and of the section 29 are chosen so that the distal opening 36 extends entirely on one and the same side of the axis 14, at a distance from the latter, and entirely in the frustoconical face 24. Formed by the intersection of the duct 30 that has a circular cross section and of the frustoconical face 24, the opening 36 has a shape close to that of an ellipse. The opening 36 is therefore notably off-centre relative to the axis 14, its centre 37 being at a distance from this axis.

The opening 36 therefore leaves free the whole of the second frustoconical face 26 forming the distal end of the needle. It can be seen notably in FIG. 5 that the terminal free end zone of the needle extends from the two sides of the axis 14 and from one and the same side of the duct 30. It is therefore formed by a relatively large quantity of material which makes it possible to reinforce the mechanical resistance thereof to wear. It is observed that the needle therefore has a free end of conical shape at the face 26, without this cone being damaged.

In the present example, the needle is made of steel. Provision is made for the end piercing zone 18 to at least, during manufacture of the needle, be the subject of a treatment making it possible to confer thereon a greater hardness than the hardness of the rest of the needle. Independently of this treatment and of the position of the duct 30 and of its openings, the needle is made in a conventional manner.

It is possible to give the duct a diameter of 0.5 mm and an inclination of 0.7° relative to the axis 14. It is possible to give the needle a total length of 35 mm and a diameter of 1.5 mm at the face 22. This is only an example and different dimensions can be chosen.

FIGS. 8 to 12 illustrate a device 10 supporting and operating the needle according to the invention. It comprises a frame 101 on which are mounted a means 104 for feeding a continuous wire 6 which is in this instance metallic, a movable support 102 supporting the hollow needle 12 and a cutting means 103.

The feeding means 104 is placed at the head of the frame 101 and makes it possible to deliver the wire 6 at a given, regulated, constant speed.

The movable support 102 is connected to the frame by means of a rectilinear guide rail 111. This movable support 102 is driven in an alternating movement between a raised position and a low position by a connecting rod 114 and a crankshaft 113 rotated by a motor (not shown) secured to the frame 101.

A "raised position" means the position of the frame corresponding to the phase of the cycle during which the frame is in the position furthest from the surface S of the profiled element P, and a "low position" means the position corresponding to the phase of the cycle during which the frame is in the position closest to the surface S.

The movable support 102 comprises a base 122 and a top 121 between which a duct 125 (in dashed lines) is made for guiding the wire 6.

The hollow needle 12 comprising the duct or channel 30 in which the wire 6 travels is fixed by its proximal end 16 to the base of the movable support 102 in the extension of the duct 125 made between the base 122 and the top 121 of the movable support 102. The point of the needle, from which the wire 6 emerges, is directed towards the surface S of the profiled element P. The needle is secured to the alternating movement of the support 2.

The diameter of the needle is chosen so as to improve the penetration of the needle in the rubber. The preferred choice will be the needle with the smallest external diameter and corresponding to the diameter of the wire to be inserted which may vary from 0.1 mm to 1 mm in the case of the most widespread applications. Naturally care should be taken to ensure that the wire flows well inside the internal channel of the needle. To do this, the difference in diameter between the wire and the internal diameter of the needle is preferably not less than 0.05 mm.

To improve the guidance of the needle in its up and down movement, a guidance means 112 in which the needle travels freely is placed at the base of the frame 102, as close as possible to the surface S of the profiled element P, so that the point of the needle does not escape from the guidance means when the movable support is in the raised position.

In order to improve the guidance of the wire 6 at the entrance of the duct 125 situated at the top 121 of the movable support 102, a wire-guidance means 123 is placed at the top of said support. This wire-guidance means 123 has the shape of a frustoconical passageway of which the smallest diameter is placed on the side of the duct 125 made between the top and the base of the movable support, and of which the largest diameter is placed at the entrance of the wire 6 into the guidance means. It goes without saying that the guidance means is not associated with this particularly simple embodiment and may be the subject of many adaptations.

A cutting means 103 comprising a blade 130 comprising a cutting wire or ridge 134 is installed in the bottom portion of the frame 101. This cutting means takes the form of a knife rotated about an axis 131, substantially parallel to the direction of the movement of the needle, by a motor (not shown) fixed to the frame 101. The cutting means is placed so that it can be adjusted in translation on the axis 131 so as to cut the wire 6 between the surface S of the profiled element and the point of the needle 152 at a given distance d that is adjustable from said point. The rotary knife is placed between the guidance means 112 of the needle 12 and the surface S of the profiled element P.

The rotary movement of the knife is adjusted so as to make a complete rotation on each back-and-forth cycle of the needle. This movement is set so that the wire 6 is cut when the point of the needle is in the raised position. Accordingly, it may be worthwhile to use the same drive means to drive the crankshaft 113 and the rotary knife 103, while adapting the mechanical transmissions accordingly.

Figure 10:
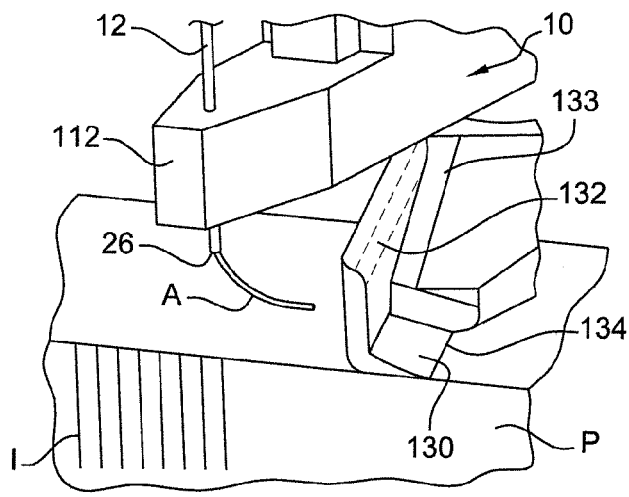

The blade 130 of the knife is extended by a paddle 132 extending substantially perpendicularly to the plane of the blade. Considering the direction of travel of the blade, the paddle 132 is placed behind the cutting wire, so as to give an impact to the leader immediately after the cutting of the wire. This impulse has the effect of forcing the free end of the wire forming the leader to fold back around the point 152 as illustrated by FIGS. 9 and 10.

Figure 12:
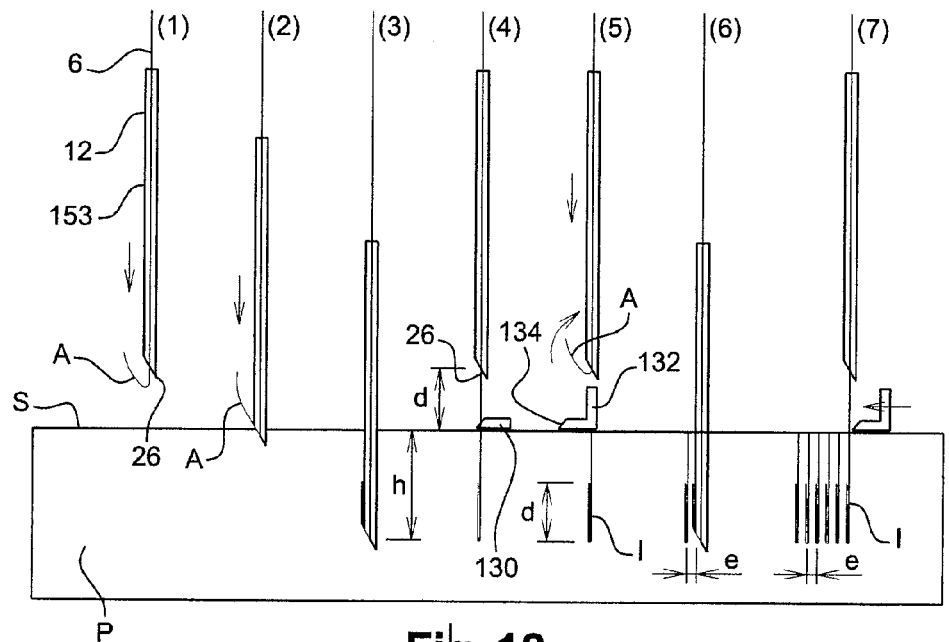
FIG. 12 represents the various phases of the cycle for installing an insert according to a first mode of use of the device.

The main positions of the cycle for driving the device according to the invention are shown in detail in FIG. 12 and are identified by the FIGS. (1) to (6) placed in parentheses. Each cycle corresponds to the insertion of one insert I in the profiled element P. The insert is formed by a section of the wire 6 and the profiled element comprises rubber and is designed to form a portion of the tread of the tire 2.

The first position (1) corresponds to the raised position of the needle 12 at the beginning of its movement towards the bottom position just after the cut. It can be seen that the free end of the wire 6 passes beyond the point of the needle 26 in order to form a leader A folded around the edge of the outlet channel of the wire from the needle.

The length of the leader A must be chosen carefully. Specifically, it must not be too long so that, during the penetration of the needle into the profiled element, the friction forces between the leader and the rubber product of the profiled element are not greater than the wedge effect that allows the needle to insert the wire into the rubber, but it should also not be too short so that, when the needle rises again, the leader remains in position at the bottom of the perforation. In practice, it should be considered, for metal or textile wires usually employed in the tire industry, that the length of the leader might usefully be between 10 times and 20 times the value of the diameter, namely as a general rule a length of between 3 mm and 5 mm, which covers most of the applications in this field. Similarly, the larger the wire diameter, the shorter the leader can be. In any case, care should be taken that the length of the leader is less than the penetration depth (h).

The second position (2) corresponds to the downward movement of the needle 12 and at the moment when the point of the needle pierces the surface S of the rubber profiled element P. This position is also illustrated in the view in perspective in FIG. 13.

Note that at this precise moment the leader A is folded along the needle 12. In this configuration the needle is immobilized by the edge of the outlet channel, which deprives the wire of any movement in the direction opposite to the direction of the travel of the needle. The edge of the outlet channel of the needle serves as a wedge and prevents the leader from pulling the wire.

Figures 13, 14:
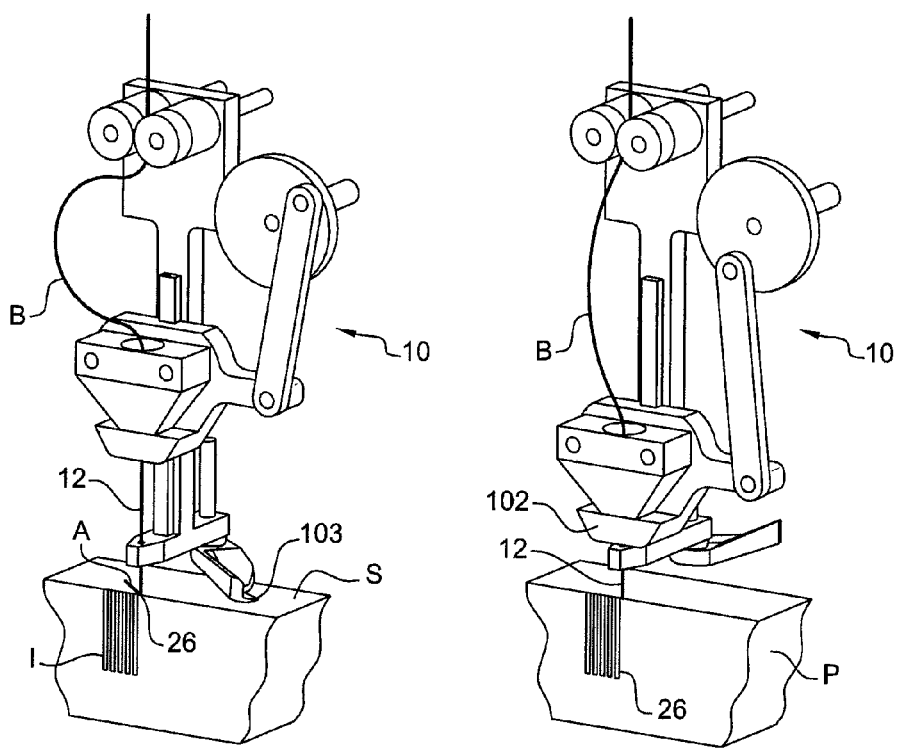
FIGS. 13 and 14 are views in perspective of the positions of the parts of the device at particular phases of the installation cycle.

The third position (3) corresponds to the bottom position of the needle, in which the point of the needle penetrates the profiled element to a given depth h, and corresponds to the view in perspective of FIG. 14.

The needle then begins a return upward movement from its bottom position to its top position illustrated at position (4). The raised position is reached when the point of the needle is distant by a given length d and is adjustable from the surface S of the profiled element P.

During this return movement upward, the free portion of the wire and of the leader A are clamped by the rubber material of the profiled element. The friction forces that are exerted on the leader and progressively on the rest of the wire released by the needle allow the wire 6 to be tensioned and the needle rises again along the wire which remains fixed relative to the surface S of the profiled element P.

When the raised position is reached, the blade 130 cuts the wire and releases a leader A available for the insertion of the next insert I as illustrated by position (4).

Note that it is worthwhile to cut the wire as close as possible to the surface S. Accordingly, it is sufficient to place the insertion device according to the invention by positioning the blade 130 as close as possible to the surface S.

This situation corresponds to the situation most frequently encountered in the tires field and usually makes it possible to achieve a relatively clean cut of the wire because the surface to some extent acts as an anvil that is capable of holding the wire during the cutting operation. When it is necessary to allow the wire to pass beyond the surface, it may be useful to have the cutting blade collaborate with a counterblade d so as to prevent return forces on the wire that are too great.

The length d, which determines the length of the leader A, is adjusted by placing the support 102 in the raised position and by adapting the axial position of the blade on its axis 131. The depth P is adjusted by modifying the amplitude of the movement of the support 102 by acting on the diameter of the crankshaft 113. The amplitude corresponds to the depth h plus the length d.

Just after the cut, as illustrated by position (5), the palette 132 strikes the wire and gives a push to the leader A in a direction substantially perpendicular to the direction of movement of the wire.

For the fold of the leader to be as pronounced as possible, the clearance j between the end of the needle 12 in the high position and the paddle 132 needs to be as small as possible and at least equal to the diameter of the wire as illustrated in FIG. 9. The clearance j may usefully be between one and five times the diameter of the wire.

It may also be practical to be able to adjust the clearance j when the length of the leader varies. For this purpose, it is possible therefore to provide sets of removable paddles of variable heights depending on the length of the desired leader and fixed to the support 133 of the blade supporting the paddle 132.

Figure 11:
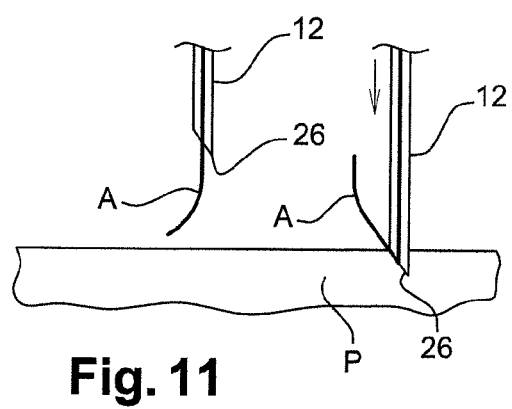

This folding movement of the leader around the point 26, as illustrated in FIG. 11, is sufficient to immobilize the rising movement of the wire inside the needle when the needle moves between the high position illustrated at (5) and the position in which the point penetrates the surface of the profiled element illustrated at (2).

In order to prevent the wire from rising again, arrangements are also made for the tension of the wire at the entrance of the duct 30 of the needle to be zero, by controlling the feeder means 104 so that the portion of wire between the feeder means 104 placed on the frame 101 and the entrance 151 of the duct 125 or of the guidance means 123, forms a loop B irrespective of the position of the movable support 102, as illustrated in FIG. 8.

Figure 15:
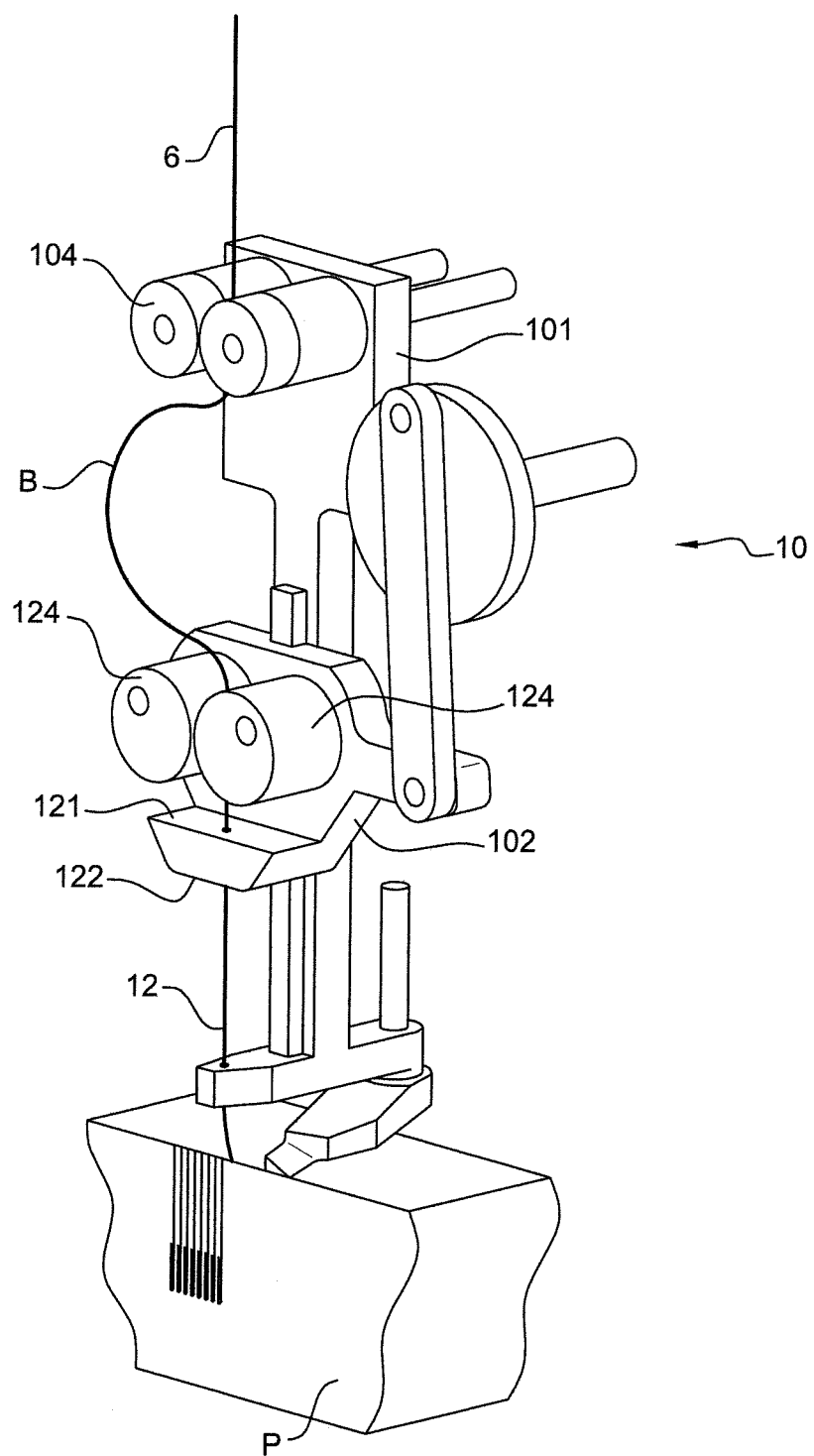
FIG. 15 is a view in perspective of a variant execution of the device according to an embodiment of the invention.

FIG. 15 illustrates the case of a device in which the guidance means takes the form of two rollers 124 between which the wire can travel. These rollers can be totally free to rotate in both directions or be prevented from rotating in one of the two directions so as to prevent the wire from rising again if the portion of wire between the rollers 124 and the feeder means 103 is tensioned too soon.

The insertion of the next insert I is carried out by moving the profiled element by one pitch e relative to the frame 101 as illustrated by position (6) and then by reproducing the cycle that has just been described.

By repeating these operations as many times as necessary, a rubber profiled element is obtained in which inserts I are inserted evenly as shown in position (7).

The insert of length h comprises at its base a fold of length d corresponding to the leader A. The presence of a double length of wire at the base of the insert has the advantage of preferably reinforcing the base of the sculpture elements, when the surface S corresponds to the surface of a tire tread in contact with the ground.

The cycle that is the subject of the present description illustrates the situation in which the inserts are inserted perpendicularly to the surface S of the profiled element P. It is naturally possible to modify the angle of insertion by inclining the frame so that the rail 11 on which the movable support 2 travels forms a given angle with the surface S.

The rectilinear shape of the section 29 makes it easier for the wire to advance at great speed in the needle while reducing the risks of jamming.

Moreover, this rectilinear shape allows it to have a very slight inclination relative to the axis of symmetry 14. Therefore, as illustrated in FIGS. 6 and 7, the ridge 39 forming the intersection between the frustoconical face 24 and the distal opening 36 has, in axial section, on the side of the axis of symmetry, an angle a that can be more easily made to be obtuse and even close to 180°. It is for example between 135 and 180°, or even between 160 and 180°. This ridge 39 is therefore very slightly pronounced in this location and reduces the risks that the needle catches the wire and pulls it out when the needle retracts to leave the wire in the rubber. Specifically, note that the material in which the piercing takes place is soft and that it applies a pressure on the wire and the needle, notably where the wire rubs on the ridge.

Naturally, many modifications can be made to the invention without departing from the context of the latter.

Provision could be made for the two axes 14 and 32 to be parallel and at a distance from one another.

The material or materials forming the needle may be non-metallic materials such as ceramics (zirconia, alumina, etc.).

The invention claimed is:

1. A method for manufacturing a tire including inserting a wire into the tire using a device for inserting a wire into the tire, the device comprising:
   a frame;
   a feeding means mounted to the frame for feeding a continuous length of a wire;
   a cutting means for cutting a wire portion from the continuous length of the wire;
   a movable support movably mounted to the frame; and
   a needle mounted to the movable support, the needle comprising:
      an elongated shaft having:
         a cylindrical part having a proximal end and a distal end;
         a piercing zone at the distal end of the cylindrical part, the piercing zone having a bisecting plane of mirror symmetry, the piercing zone having a diameter that reduces toward a distal end of the shaft in a conical shape;
      a shaft axis; and
      a single duct extending lengthwise through the entire cylindrical part from a proximal opening in the proximal end of the cylindrical part through the cylindrical part, the single duct issuing into the piercing zone to a single distal opening, the single duct being off center relative to the shaft axis at the single distal opening, the single distal opening being in a part of the piercing zone removed from a distal end of the piercing zone, the single duct being rectilinear, the distal opening extending entirely at a distance from the shaft axis,
   wherein the needle is positioned on the movable support so that wire fed from the feeding means enters the elongated shaft, and
   wherein the movable support is movable between a low position in which the piercing zone of the needle is positioned to pierce a surface of the tire, and a raised position in which the piercing zone of the needle is not in contact with the surface of the tire, the method comprising:
   providing a tire;
   feeding the wire into the feeding means of the device;
   feeding a portion of the wire into the piercing zone of the needle;
   positioning the movable support to the low position so that the piercing zone of the needle pierces a surface of the tire;
   after the piercing zone of the needle has pierced the surface of the tire and after the portion of the wire has been fed into the piercing zone of the needle, positioning the movable support to the raised position so that an end of the portion of the wire remains inserted in the surface of the tire; and after the end of the portion of the wire remains inserted in the surface of the tire, cutting the wire with the cutting means between the surface of the tire and the piercing zone of the needle.

2. The method for manufacturing a tire according to claim 1, wherein the duct has a duct axis that is inclined relative to the shaft axis.

3. The method for manufacturing a tire according to claim 1, wherein the needle has a support zone at the proximal end of the shaft into which the proximal opening opens while being concentric with the support zone.

4. The method for manufacturing a tire according to claim 1, wherein the needle is made of metal or of metal alloy.

5. The method for manufacturing a tire according to claim 1, wherein the piercing zone has a greater hardness than that of another portion of the needle.

6. A device for inserting a wire into a tire in combination with a tire and a continuous length of wire, comprising:
a frame;
a feeding means mounted to the frame for feeding the continuous length of a wire;
a cutting means for cutting a wire portion from the continuous length of the wire;
a movable support movably mounted to the frame; and
a needle mounted to the movable support, the needle comprising:
an elongated shaft having:
a cylindrical part having a proximal end and a distal end;
a piercing zone at the distal end of the cylindrical part, the piercing zone having a bisecting plane of mirror symmetry, the piercing zone having a diameter that reduces toward a distal end of the shaft in a conical shape;
a shaft axis; and
a single duct extending lengthwise through the entire cylindrical part from a proximal opening in the proximal end of the cylindrical part through the cylindrical part, the single duct issuing into the piercing zone to a single distal opening, the single duct being off center relative to the shaft axis at the single distal opening, the single distal opening being in a part of the piercing zone removed from a distal end of the piercing zone, the single duct being rectilinear, the distal opening extending entirely at a distance from the shaft axis,
wherein the needle is positioned on the movable support so that wire fed from the feeding means enters the elongated shaft, and
wherein the movable support is movable between a low position in which the piercing zone of the needle is positioned to pierce a surface of the tire, and a raised position in which the piercing zone of the needle is not in contact with the surface of the tire.

7. The combination according to claim 6, wherein the duct has a duct axis that is inclined relative to the shaft axis.

8. The combination according to claim 6, wherein the needle has a support zone at the proximal end of the shaft into which the proximal opening opens while being concentric with the support zone.

9. The combination according to claim 6, wherein the needle is made of metal or of metal alloy.

10. The combination according to claim 6, wherein the piercing zone has a greater hardness than that of another portion of the needle.

* * * * *